L. W. FROMM.
MANUFACTURE OF ARTIFICIAL TEETH.
APPLICATION FILED AUG. 7, 1917.
1,254,670.
Patented Jan. 29, 1918.
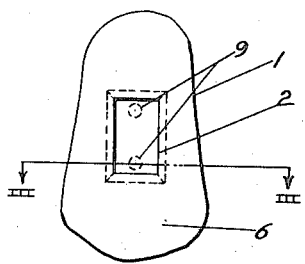
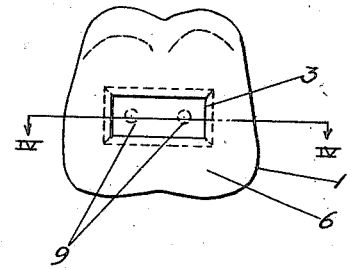
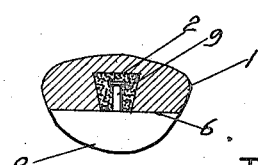
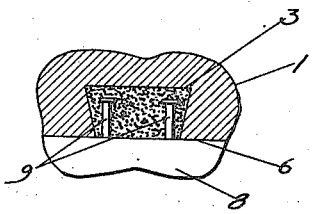
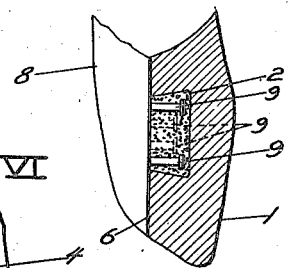
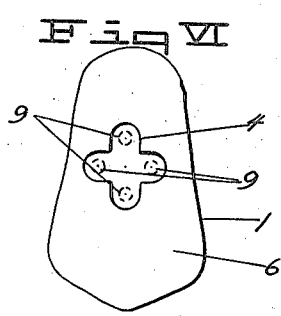
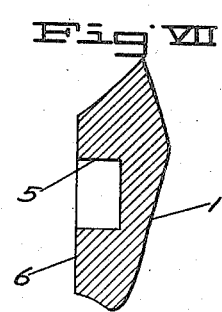

UNITED STATES PATENT OFFICE.

LUTHER W. FROMM, OF NOME, TERRITORY OF ALASKA.

MANUFACTURE OF ARTIFICIAL TEETH.

1,254,670.      Specification of Letters Patent.   Patented Jan. 29, 1918.

Application filed August 7, 1917. Serial No. 184,854.

*To all whom it may concern:*

Be it known that I, LUTHER W. FROMM, a citizen of the United States of America, residing at Nome, in the Territory of Alaska, have invented certain new and useful Improvements in the Manufacture of Artificial Teeth, of which the following is a specification, reference being had to the accompanying drawing.

My invention relates to means for effecting the repair of artificial teeth in place, that is to say, upon a bridge, crown, or plate. In work of that description in which teeth of ordinary construction are used, each tooth-front is supplied, in manufacture, with permanent pins that are so by reason of their being baked into the porcelain or other material of which the front is made, the pins referred to being in practical application set and secured into the metal backing of the work. Consequently, whenever a tooth-front is broken the pins are left protruding from the backing in the form of stumps. According to the present practice that generally obtains in dentistry it is in such case necessary to remove the stumps in order to supply a new front, with the result that such repair work is rendered either impossible except by complete removal of the broken front where that is possible, or is made, by conditions described, difficult, expensive and insecure.

By my invention, the stumps of pins above described are utilized, without any change in them, to hold a new tooth-front in place. This is made practicable by providing, in manufacture, a series of tooth-fronts each having a rearwardly opening cavity adapted to receive, with looseness of fit, a pair of pin stumps, and, having first filled said cavity with a suitable cement, adjusting the front to its back and holding those parts together until the cement sets. Thereupon the cavity and space between the tooth-front and its back is filled by the cement and the front is held securely in place, the stumps aforesaid being well anchored in the mass of cement that fills the cavity.

What constitutes my invention will be hereinafter specified in detail and succinctly set forth in the appended claims.

In the accompanying drawing,

Figure I is a rear elevation of the front for a long tooth, an incisor for instance, showing a pin-receptive cavity therein disposed lengthwise of the tooth-front, and showing in dotted lines a pair of pin stumps therein.

Fig. II is a similar view of a broad tooth, for instance a molar, showing a transversely disposed pin-receptive cavity therein.

Fig. III is a section of a completed tooth as on the line III—III of Fig. I.

Fig. IV is a similar view as if taken on line IV—IV of Fig. II.

Fig. V is a longitudinal section of a tooth completed in accordance with my present invention, illustrating in full and dotted lines, respectively, variations in such relative disposition of pins as are likely to occur constantly in every day practice.

Fig. VI is a view of a tooth-front similar to Fig. I, showing a modified form of pin-receptive cavity, whereby economy of space is provided, and whereby provision is at the same time made in the same tooth-front for the reception of either longitudinally or transversely disposed pairs of pin stumps.

Fig. VII is a longitudinal sectional view of a tooth-front, showing a further modification of the pin-receptive cavity, to-wit, one in which the side walls are at right angles to the rear face of the front instead of inclined thereto as shown in Fig. I and other figures.

Referring to the numerals on the drawing, 1 indicates a tooth-front, which, as contemplated in my invention, is designed to be manufactured for commercial use like ordinary false teeth in series varied according to shape, color, and size. Besides such differentiations as are now employed in the usual commercial, I propose to provide a further differentiation in respect to the disposition of a pin-receptive cavity that is let into the rearward face thereon. 2 indicates such a cavity shown as longitudinally disposed in Figs. I, III and V. 3 indicates a like cavity but transversely disposed as shown in Figs. II and IV.

In Fig. VI a four lobed cavity 4 is shown and in Fig. VII a cavity 5 similar to cavity 1 is shown with one variation that its side walls are at right angles instead inclined to its plane backing-side 6.

Another differentiation should be provided in commercial manufacture, namely, in respect to the disposition of the cavity, of whatever form it may be, in respect to the longitudinal and transverse axis of the tooth. This is required to meet such variations of the disposition of the pins in tooth-fronts as occur in ordinary manufacture and may be predetermined accordingly by any one sufficiently acquainted with the prevailing mode of manufacture of artificial teeth.

In the several figures of the drawings the cavity is in each instance shown as bisected by the respective axes, aforesaid. It is thought to require no additional illustration to indicate variations from such uniformity.

In Figs. I to V, inclusive, the pin-receptive cavities, 2 or 3, are shown as provided with undercut walls. The cavity 5 in Fig. VII has walls at right angles to the backing face 6, while the walls of the cavity 4, of Fig. VI may be of either kind. There is believed to be some additional security of union afforded in the undercut wall, but, nevertheless, in many cases the right angled wall 5 is entirely practicable and in some cases is even preferable.

The metallic backing member which, in service, carries the tooth-front is sufficiently indicated in the several figures of the drawing by the reference numeral 8. In order to arrive at a clear apprehension of my invention it is necessary to take into consideration that the backing 8 forms an integral part of a crown, plate, or bridge, and that when the crown, plate, or bridge was first made it is assumed to have been completed in the usual way by the addition to the metal backings, of the ordinary porcelain fronts. In the first manufacture of the crown, plate, or bridge, the front is provided with pins 9 permanently baked in the process of manufacture into the material of which the front is made; and the projecting ends of those pins are permanently incorporated with the metal backing 8 as by the use of solder or other fusible material. Consequently, except in case of breakage, the several parts of a piece of work are, in its completion made permanently inseparable. It is to provide means of repair of injury to such work occasioned by the breaking away from a pair of pins 9 of a porcelain front that my present invention was devised.

In further explanation of my invention, let it be now considered that upon such breakage as is referred to in the last preceding sentence, there remain the pins 9 which held the broken front and which protrude outwardly from their backing 8 in the shape of stumps. Those stumps must be taken into account in any attempt at repair that may be made.

In practice, a backing to be repaired as described, is perfectly stripped and cleaned, together with the pin stumps which protrude into the space into which a new front is to be supplied. A proper front is then selected with reference to size, color, and disposition of the cavity in it made to receive the pin stumps aforesaid, the selection in the last named particular being made with reference to the disposition of the pin stumps in relation to their back and to each other.

Selection having been carefully made and verified by insertion of the selected front into place, the front is then removed and its cavity is filled, preferably to a slight excess, with any suitable and preferred cement of a consistency to adhere to the walls of the cavity during necessary manipulation.

The front is then applied to the face of the backing, and through the application of lateral pressure a true fit of the front upon the backing having been effected, it is there held in place until the cement is sufficiently set. In thus applying the front against the backing, after an excess of cement has been supplied to the cavity, the cement is, by pressure, not only packed into the cavity and about the pins, which are usually headed as shown clearly in Fig. V, for example, but it is also squeezed into a thin aseptic sheet between the parts composing the tooth and is adherent to both of them.

The forwardly protruding disposition of the pin stumps and the preservation of their integral union with their backing afford an advantage in assembling and matching a front to its backing over a repair tooth front that is required to be slipped into contact with its backing from above or below the transverse axis of the tooth. Because such requirement imposes a limitation in respect to repair work, by reason of the necessity of eliminating from the completed tooth the metal biting edge which is often necessary or preferred, or of forming such edge after the front is secured to its backing, which is objectionable for obvious practical reasons.

What I claim is:

1. The method of repairing artificial teeth which consists in preserving in the backing of a crown, plate, or bridge the pin stumps remaining upon the breaking away of a tooth-front, providing a repair tooth-front with a pin-receptive cavity of excess transverse dimensions for the admission of said stumps, supplying said cavity with a suitable cement, and then uniting the said backing and front by pressure applied to effect a true fit of the front upon the backing and maintained for a period sufficient to allow the cement to set.

2. A new article of manufacture an artificial tooth-front provided with a rearwardly opening pin receptive cavity adapted to receive a pair of pin-stumps of predetermined relative disposition, the transverse dimensions of said cavity being in excess of that actually required to admit said pin stumps whereby a range of adjustability for the purpose specified is gained.

In testimony whereof, I have hereunto set my hand in the presence of two subscribing witnesses.

LUTHER W. FROMM.

Witnesses:
G. J. LOMEN,
CARL J. LOMEN.